United States Patent
Beuschel et al.

(10) Patent No.: US 8,005,616 B2
(45) Date of Patent: Aug. 23, 2011

(54) METHOD FOR DETERMINING RELEVANT OBJECTS

(75) Inventors: Michael Beuschel, Stammham (DE); Werner Steiner, Schrobenhausen (DE)

(73) Assignee: ADC Automotive Distance Control Systems GmbH, Lindau (DE)

( * ) Notice: Subject to any disclaimer, the term of this patent is extended or adjusted under 35 U.S.C. 154(b) by 610 days.

(21) Appl. No.: 11/665,981

(22) PCT Filed: Oct. 12, 2005

(86) PCT No.: PCT/DE2005/001827
§ 371 (c)(1),
(2), (4) Date: Apr. 20, 2007

(87) PCT Pub. No.: WO2006/042512
PCT Pub. Date: Apr. 27, 2006

(65) Prior Publication Data
US 2009/0070039 A1    Mar. 12, 2009

(30) Foreign Application Priority Data

Oct. 20, 2004  (DE) .......................... 10 2004 051 212
Sep. 17, 2005  (DE) .......................... 10 2005 044 561

(51) Int. Cl.
*G08G 1/16* (2006.01)
*G06F 17/10* (2006.01)

(52) U.S. Cl. ............ 701/301; 701/70; 701/93; 303/191; 340/436

(58) Field of Classification Search .................... 701/23, 701/70, 301; 340/436
See application file for complete search history.

(56) References Cited

U.S. PATENT DOCUMENTS

| | | | | |
|---|---|---|---|---|
| 5,574,644 A * | 11/1996 | Butsuen et al. | ................. | 701/93 |
| 5,889,786 A * | 3/1999 | Shimogama | ................. | 714/720 |
| 6,017,102 A * | 1/2000 | Aga | ................. | 303/191 |
| 6,408,247 B1 * | 6/2002 | Ichikawa et al. | ................. | 701/301 |
| 6,437,688 B1 * | 8/2002 | Kobayashi | ................. | 340/435 |
| 6,571,176 B1 * | 5/2003 | Shinmura et al. | ................. | 701/301 |
| 6,624,747 B1 * | 9/2003 | Friederich et al. | ................. | 340/436 |
| 7,099,764 B2 * | 8/2006 | Seto et al. | ................. | 701/70 |
| 7,409,295 B2 * | 8/2008 | Paradie | ................. | 701/301 |
| 2001/0016798 A1 * | 8/2001 | Kodaka et al. | ................. | 701/301 |
| 2003/0060956 A1 * | 3/2003 | Rao et al. | ................. | 701/45 |
| 2004/0193351 A1 * | 9/2004 | Takahashi et al. | ................. | 701/70 |
| 2004/0193374 A1 * | 9/2004 | Hac et al. | ................. | 701/301 |
| 2006/0155455 A1 | 7/2006 | Lucas et al. | | |

FOREIGN PATENT DOCUMENTS

EP    1 107 211    6/2001
* cited by examiner

*Primary Examiner* — Thomas G Black
*Assistant Examiner* — Lin B Olsen

(57) ABSTRACT

Disclosed is a method for determining relevant objects in the vicinity of a motor vehicle by an environmental detection sensor. A calculation of the probable trajectory of objects is thus not necessary. The only objects that are classified as relevant are those with a greater probability of a collision despite an average driver response such as evasive action and/or braking. The probability of a collision is determined in accordance with at least two values that are calculated from vehicle and environmental data. A first value describes future evasive action or evasive action that has already been initiated and a second value describes a deceleration operation. Each of the two or more values is delimited by a threshold value, which indicates the start of a critical range. The braking devices are activated if at least one of the determined values lies in the critical range.

12 Claims, 3 Drawing Sheets

METHOD FOR DETERMINING RELEVANT OBJECTS

BACKGROUND OF THE INVENTION

The invention relates to a method and a device for determining relevant objects in the vicinity of a motor vehicle.

An important feature of driver's assisting systems with safety or convenience function is a collision warning function. A warning device of this type is shown in WO2005055171. A probability of a collision is calculated while assuming that a vehicle driving ahead spontaneously decelerates. In this case it is not taken into account that the driver can prevent a collision in many cases by means of an evasive action, or that the driver plans overtaking. In this case the described system releases a false alarm. DE 10356309 equally describes a collision warning device. Here, all possible trajectories of the own vehicle and all possible trajectories of all detected objects are evaluated. This requires plenty of calculating and costly sensors with a broad reach for determining the object trajectories.

It is the object of the present invention to safely, simply and cost-efficiently recognize those objects which have a high probability of a collision.

SUMMARY OF THE INVENTION

This object is achieved in accordance with the invention by a method for determining relevant objects in the vicinity of a motor vehicle by means of an environmental detection sensor. In the method, data from the environmental detection sensor the distance and relative speed to an object and from the data of further vehicle sensors the current state of movement of the vehicle, in particular the vehicle speed and the steering angle, is calculated. In the method, only objects are classified as relevant with which despite an average driver response such as evasive action and/or braking action a collision occurs with a probability greater than 50%, wherein at least two collision-relevant values from the vehicle and/or the environmental sensor data are calculated, wherein a first collision-relevant value describes future evasive action or evasive action that has already been initiated and a second collision-relevant value describes a deceleration operation for preventing a collision, and each of the collision-relevant values is limited by an upper or lower threshold value, which indicates the beginning of a critical range, and the related threshold values are only determined from the vehicle sensor data, and a first collision-relevant value indicates the distance (x) between vehicle and object and the related threshold value indicates the relevant distance (x_rel), at which it is possible to drive around an object with an average evasive action, and in case of driving straightforward the relevant distance (x_rel) is determined from the intersection of the external detection range of the sensor and the vehicle trajectory with minimum radius and a deceleration size, the minimum radius being determined subject to the vehicle speed (v_car) and the braking device is activated, if at least one of the collision-relevant values lies in the critical range.

A method for determining relevant objects in the vicinity of a motor vehicle by means of an environmental detection sensor is indicated. For this purpose no calculation of the probable trajectory of the objects is required, as it is described in the state of the art. As the determination of relevant objects is effected in the short range, e.g. a maximum reach of the environmental detection sensor of 8 m to 15 m is sufficient. A short-range sensor is considerably more favorable in price than e.g. sensors for driver's assisting systems, which have a reach of approx. 150 m to 200 m. In the inventive method the only objects that are classified as relevant are those with a greater probability of a collision despite an average driver response such as evasive action and braking. For this purpose the probability of a collision is determined subject to at least two collision-relevant values that are calculated from vehicle and environmental data. E.g. the vehicle speed, the relative speed towards the object and a curve drive are included in the calculation of the collision-relevant values. A first collision-relevant value characterizes a future evasive action or an evasive action that has already been initiated, which an average driver would carry out, if, e.g. an obstacle would be on the overtaking lane. A second collision-relevant value describes a slowing down operation, which an average driver carries out e.g. to prevent a collision.

Each of the at least two values is delimited by an upper or a lower threshold, which indicates the start of a critical range. The braking means are activated without prior warning to the driver, if the first and/or the second collision-relevant value lies in a critical range.

This proceeding is based on the low time period, which in case of a short-range monitoring may pass between the recognition of a critical slow driving situation and the taking of a necessary counter action. Warning the driver is renounced on and directly a counter measure, the autonomous braking of the vehicle is released. This release can be made dependent on the behavior pattern of the driver and can always be overruled by the driver with clear reactions, e.g. activation of the accelerator pedal. The function of this proceeding is designed for a low false alarm rate.

In a preferred form of embodiment the first collision-relevant value x indicates the distance between object and vehicle. The related threshold value, the relevant distance (x_rel), describes exactly the distance, at which it is possible to drive around an object with an average evasive action. In case of driving straightforward the relevant distance (x_rel) is determined from the intersection of the external detection range of the sensor and the maximum possible trajectory change. The maximum possible trajectory change is calculated subject to the vehicle speed (v_car) and a cross acceleration.

In particular during a curve drive of the vehicle the relevant distance (x_rel) is defined as a function of the steering angle, in order to reduce the number of false alarms. The idea of defining the relevant distance (x_rel) consists in that starting from the current steering angle a certain future change in the steering direction in both directions is assumed within a determined time. Here, in turn, the maximum possible trajectory change is determined as described above.

In a special embodiment of the invention an environmental detection sensor with a spatial resolution, i.e. with several receiving channels is provided. In this case the relevant distance (x_rel) is determined for each space segment.

In a preferred embodiment the extension of an object is included for assessing the relevant distance (x_rel). An extended object is detected in several or in all detection ranges of the sensor at an approximately identical distance. In this case an evasive action is hardly possible. Therefore, here a corrected larger relevant distance is provided.

In a particular embodiment of the invention the second value indicates a driving deceleration a, which is necessary not to drive against an object, the related threshold value is the relevant deceleration (a_rel). The latter indicates the maximum deceleration, which an average driver would initiate in usual traffic situations.

In particular, for the relevant deceleration (a_rel) a fixed value between 0.2 g and 0.4 is chosen. If for preventing a collision with an object a driving deceleration larger than the relevant deceleration (a_rel) is necessary, a critical situation is on hand. In a special form of embodiment of the invention the relevant deceleration (a_rel) is a fixed value between 0.25 g and 0.35 g. The deceleration actually requested in case of a braking intervention to prevent a collision can deviate from the relevant deceleration, which merely serves as a threshold value.

In a special embodiment of the invention the maximum strength of a braking intervention for the prevention of a collision is scaled with the vehicle speed. With this the intervention can be reduced e.g. between 40 and 60 km/h from 0.3 g to 0 g. The intervention can also be masked out at a standstill of the vehicle.

The method is carried out in particular only in a predefined range of the vehicle speed or relative speed, resp., between the vehicle and the object. The predefined range is correlated with the detection range of the sensor. With a relative speed Δv of 25 km/h, a relative deceleration a_rel of 0.3 g and an activation time of the brake Δt_b of 400 ms the relative distance x_rel results in $$x\_rel = \Delta v^2/(2 \cdot a\_rel) + \Delta v \cdot \Delta t\_b = 11 \text{ m}$$

In a particular form of embodiment of the invention in case of a reverse drive of the vehicle the method is not carried out.

In a special form of embodiment of the invention the detection range is substantially smaller than 15 m. This corresponds approximately to the reach of pre-crash sensors. Multifunctional use of the provided environmental detection sensor is thus provided for different safety functions and is advantageous for reasons of cost savings.

Moreover, a device with an environmental detection sensor and a control device with a stored programming is introduced for carrying out a method as described above.

The invention will be further described on the basis of examples of embodiment and 5 representations.

BRIEF DESCRIPTION OF THE DRAWINGS

In the figures:

FIG. 4 bottom: Relevant distance x_rel subject to the relative speed for moving extended and small objects;

DETAILED DESCRIPTION OF THE DRAWINGS

Figure 1:
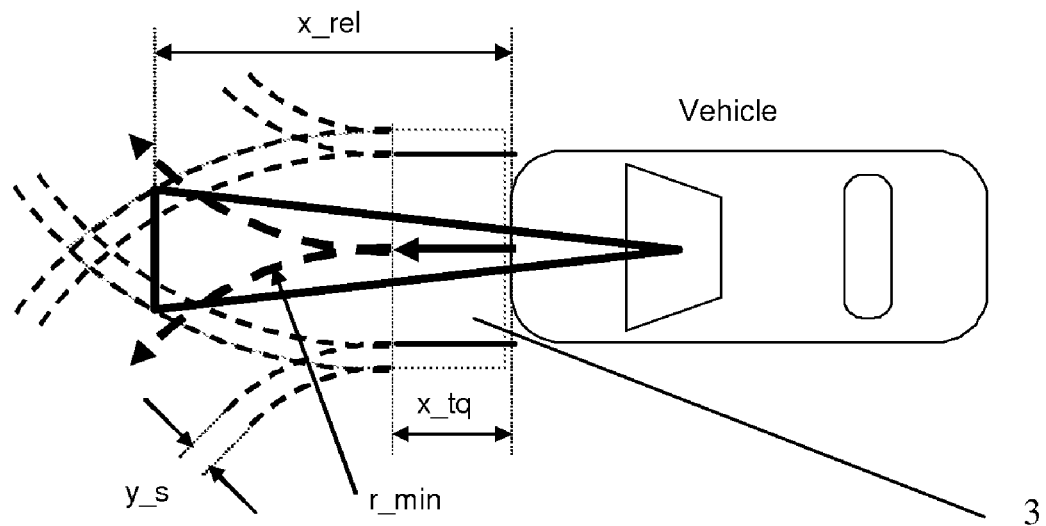
FIG. 1: Determination of the relevant distance x_rel (evasive action)

In FIG. 1 the determination of the relevant distance x_rel is schematically shown. The relevant distance x_rel is determined subject to the signed intrinsic speed v_car of the vehicle, however, a reverse drive being provided with a negative sign. Objects comprising a smaller distance to the vehicle than the relevant distance x_rel can no longer be driven around with a typical steering behavior. The typical steering behavior is substantially described by a maximum cross acceleration a_ymax. In addition, in simplified manner a deceleration time Δt_q until build-up of the respective possible cross acceleration is assumed as well as a lateral clearance distance y_s within which a critical situation is to be recognized. Typical values for the three mentioned sizes are e.g. a_ymax=0.15 g, Δt_q=200 ms and y_s=0.2 m. The minimum radius r_min to r_min=v_car²/a_ymax is determined from the vehicle speed v_car and the cross acceleration.

In FIG. 1 an evasive action is shown. In the top view the vehicle trajectories are shown with minimum radius r_min to the left and to the right in interrupted lines. A curve drive is recorded in simplified manner after a deceleration time of the cross acceleration Δt_q, which is required for building up the respective possible cross acceleration. In this time the vehicle covers a distance x_tq. For trajectory of the vehicle, moreover, a clearance distance y_s is added. The gray colored surface 3 indicates a relevant range, in which the vehicle would collide with an object in case of an average steering behavior. The detection range of the sensor is shown in continuous lines. The intersection of the external detection range of the sensor and the vehicle trajectories with the minimum radius r_min indicates the relevant distance x_rel. In FIG. 1 the determination of the relevant distance x_rel is shown for a sensor with a recording channel. In a further form of embodiment the lateral ranges are monitored with further recording channels. Also for these ranges the relevant distance x_rel is determined as described.

Figure 2:
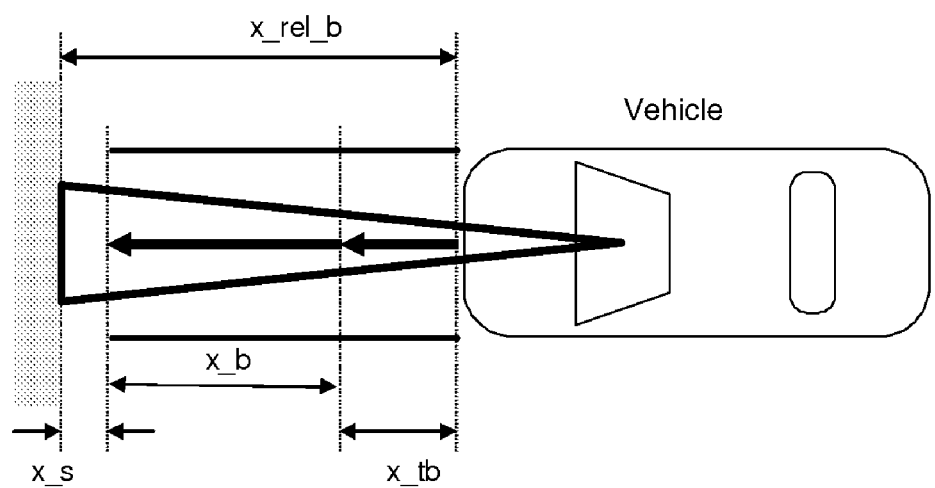
FIG. 2: Determination of the relevant vehicle deceleration a_rel.

Referring to FIG. 2, as a further driver's reaction a braking action is taken into consideration. Here, an activating time of the brake Δt_b and a clearance distance x_s is provided. Typical values for the activating time and the clearance distance are Δt_b=400 ms and x_s=0.2 m. The calculated braking action is composed of three sections. At first a time period Δt_b is required to activate the brakes; during this time the distance x_tb is covered. For the actual braking distance x_b a clearance distance x_s is added. The sum of the three distances x_tb, x_b and x_s results in the relevant braking distance x_rel_b. The deceleration a, which is required in case of an average driver behavior to prevent a collision with an object, can be calculated e.g. with the following relation:

$$a = (\Delta v)^2/2/(x - x\_s - \Delta v \cdot \Delta t\_b),$$

wherein x indicates the distance between vehicle and object and Δv the relative speed.

In the simplest case of operation the brake is activated, if the required drive deceleration a exceeds a threshold of approx. a_rel=0.3 g as well as if the relevant distance x_rel is fallen below. This action reduces the number of false alarms very efficiently. However, also cases are conceivable, in which it is reasonable that a slowing down of the vehicle is released, if only one of the values x_rel or a_rel lies in a critical range.

The clearance distances x_s and y_s can calculatively also contain negative values in order to stop the responsiveness of the method or to limit the braking intervention to a reduction in collision consequences.

Figure 4:
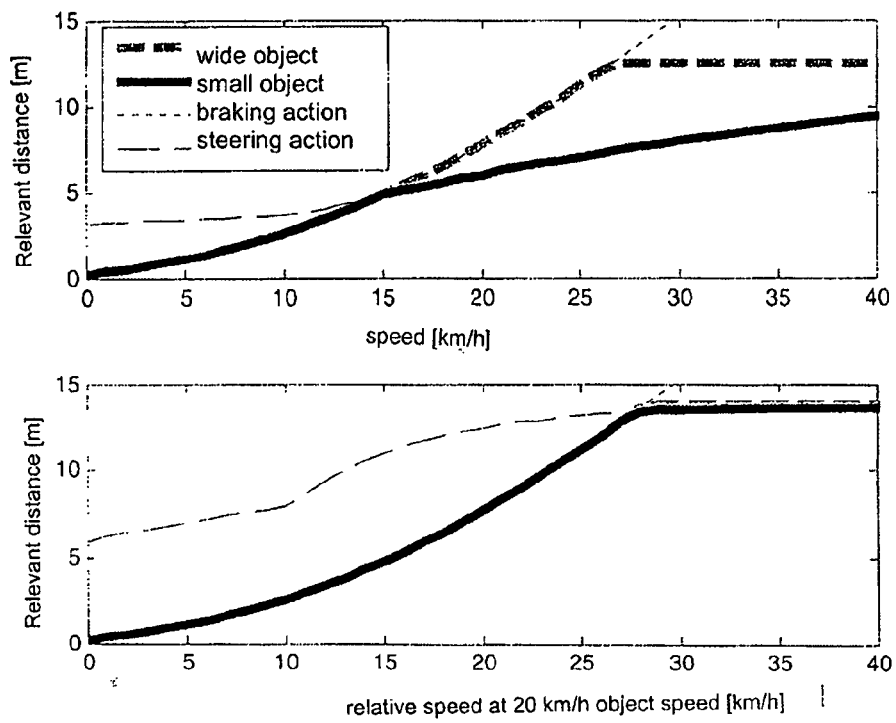
FIG. 4 top: Relevant distance x_rel subject to the vehicle speed for standing extended and small objects.

For the event of a stationary object the relevant distance x_rel can be plotted for an evasive action or the relevant braking distance x_rel_b in a diagram above the vehicle speed v_car, as here the vehicle speed v_car corresponds to the relative speed Δv. The result is shown in FIG. 4. It becomes clear that an activation of the brakes at a speed of below approx. 15 km/h in this form of the invention is merely controlled by the relevant braking distance. Above this, it is limited by the relevant distance range; thus, in this range a collision can be attenuated but not prevented.

Figure 3:
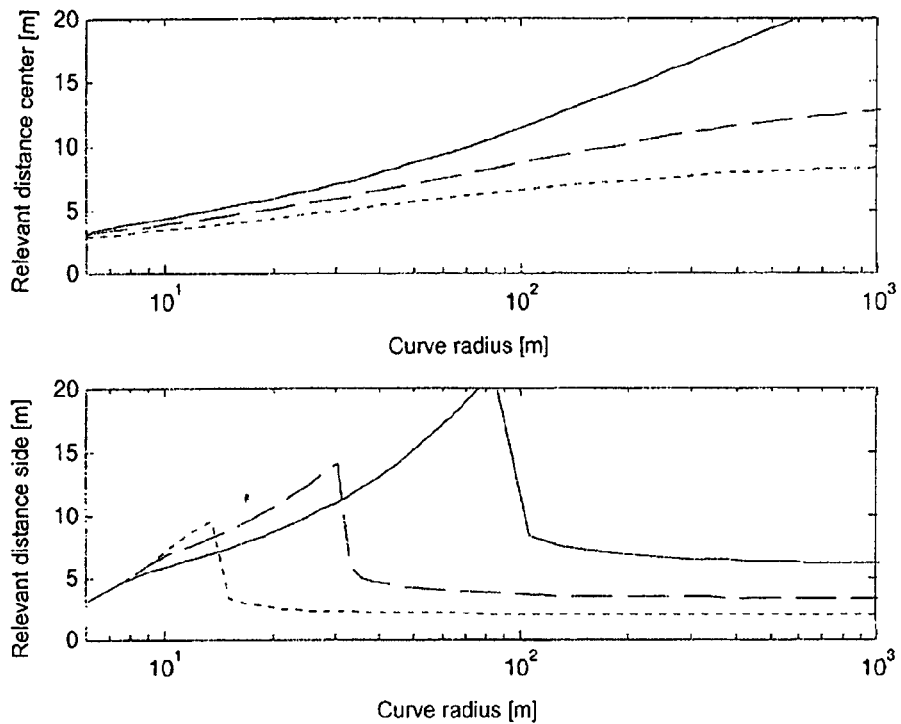
FIG. 3: Relevant distance along the radius in case of a curve drive.

If the vehicle is already in a curve, for an environmental detection sensor with one central and two detection ranges arranged laterally thereto, the relevant distances x_rel result, which in case of the central detection channel are plotted on the top in FIG. 3 and in case of a lateral detection range are plotted on the bottom in FIG. 3 above the curve radius. Plotting has been performed for different aperture angles of the sensor. In addition to the respectively possible minimum curve radius the relevant distance x_rel for the lateral detection range can also depend on the vehicle speed v_car.

Under certain conditions the range for collision prevention can be extended. This is reasonable e.g. for recognizing a wide object, i.e. in all detection ranges of the sensor an object is detected at approx. identical distance and at approx. identical speed. As in this case an evasive action is practically no longer possible, also with speeds above approx. 15 km/h furthermore only exceeding of the relevant deceleration a_rel can serve as a release criteria, even if in this case the relevant distance x_rel is exceeded.

According to the current steering angle the detection ranges of the environmental detection sensor can be switched over to evaluation. Advantageously, here fading of the relevant decelerations a_rel of the individual detection ranges takes place, which starts as soon as the relevant distance of a second detection range is larger than the relevant distance of a first detection range.

A further scenario susceptible to a false alarm is the fast approaching of a curve, at which drive lane edge an object is recognized, followed by subsequent hard slowing down by the driver. In this case the method presented here should not release an undesired activation of the brakes. For this case of a stationary object the relative distance x_rel can be plotted for an evasive action or the relevant braking distance x_rel_b, resp., in a diagram above the vehicle speed v_car, as here the vehicle speed v_car corresponds to the relative speed v_rel. The result is shown in FIG. 4 on the top. In the normal operation, e.g. no wide object has been recognized, the limits for the relevant distance above 15 km/h run lower than those for the relevant braking distance at 0.3 g, i.e. in the phase of fast approaching to the curve the driver does not reach the release range of the brakes without risking a collision. Below 15 km/h the relevant distance is determined by the relevant deceleration a_rel for the central approaching of a vehicle. If the driver wants to drive the curve without a collision, he must take into consideration the turn radius of the vehicle; the latter then represents an additional clearance distance, which suppresses release of the brakes. Thus, the fast approaching of a curve does not release a false alarm.

Static and moved objects are implicitly taken into account by the presented method, as the relevant distance x_rel depends on the vehicle speed v_car, the relevant deceleration, however, depends on the relative speed v_rel. Thus, for static objects the release curves for small and wide objects shown on the top in FIG. 4 result. With a small object the collision can be prevented up to approx. 15 km/h, with a wide object up to approx. 27 km/h. If the vehicle speed is higher than the relative speed (i.e. object moves in the same direction as the vehicle), the relevant distance increases accordingly. The lower graphics shows the same curves for an object which moves at 20 km/h. With this the collision is prevented also with a small object up to approx. 28 km/h.

Figure 5:
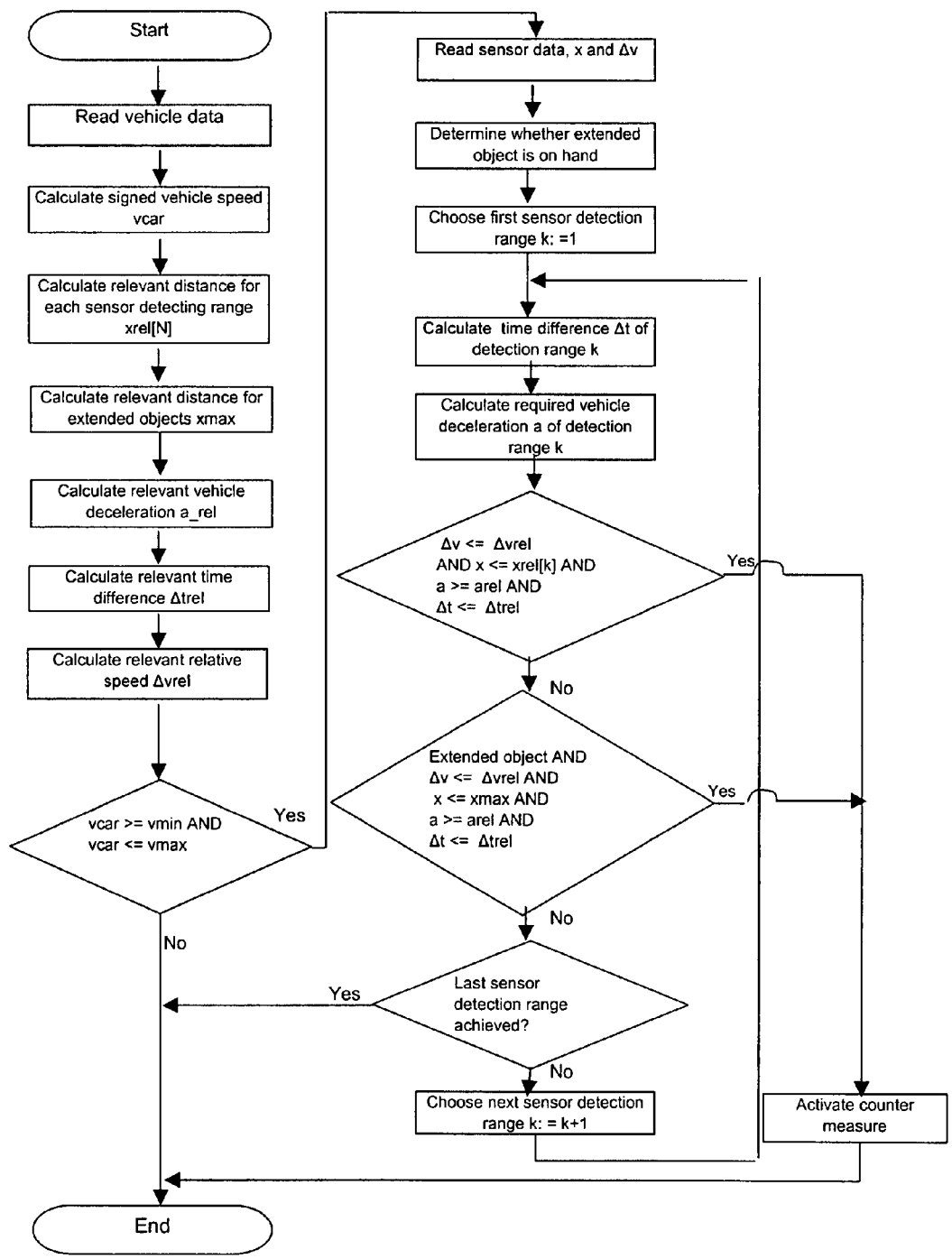
FIG. 5: Block diagram of the method.

One form of embodiment of the inventive method is shown in a block diagram in FIG. 5. At first the required vehicle data is read in. From this the signed vehicle speed v_car is calculated. For each of the N detection ranges of the environmental detection sensor the relevant distance x_rel is calculated. Moreover, the relative distance for a wide object is determined. The threshold value of the relevant acceleration is determined. Moreover, the threshold value for the relevant relative speed $\Delta v\_rel$ is calculated. The upper threshold value $\Delta v\_rel$ indicates whether an activation of the brake is still reasonable or whether e.g. the dead time of the brake activation is larger than the remaining time until the collision.

As an additional criteria a further threshold value, the relevant time difference until the collision $\Delta t\_rel$ can be used. This takes into account that the driver can e.g. change the track within a certain time period and therefore, before beginning of this time period no braking intervention should occur. The time difference $\Delta t$ results from the relative speed $\Delta v$ and the distance x to $$\Delta t = x/\Delta v.$$

The threshold values are either constant or a function of the vehicle speed. After this first set of data has been calculated from the vehicle data, at first it is checked whether the vehicle speed lies in the predefined interval. If the vehicle is too fast, i.e. a vicinity sensor can no longer be reasonably used for preventing a collision, the program is terminated. The same applies for a reverse drive. If the vehicle speed lies in the predefined interval, those sensor data are read in, which indicate whether and at which distance x and at which relative speed $\Delta v$ an object moves in the detection range of the sensor. For a first sensor detection range k the time difference $\Delta t$ and the required vehicle deceleration a is calculated. If the relative speed $\Delta v$ between the vehicle and the object is smaller or equal to the threshold value $\Delta v\_rel$ and the distance x to the object is smaller or equal to the relevant distance x_rel and if the required vehicle deceleration a is larger or equal to the relevant deceleration a_rel and if the time difference $\Delta t$ is smaller or equal to the threshold value $\Delta t\_rel$ a counter measure is activated. If one or more of the four mentioned criteria are not met, it is checked whether an extended object is on hand and whether the four mentioned criteria for an extended object are met. If the check is terminated with "yes", a counter measure is initiated. If the check is terminated with "no" and all sensor ranges have been evaluated, the method is terminated. If not all sensor ranges have been evaluated, the next sensor range k+1 is chosen and all steps beginning from the calculation of the time difference $\Delta t$ run through anew.

The invention claimed is:

1. A method for determining relevant objects in a vicinity of a motor vehicle by using an environmental detection sensor, the method comprising:
    calculating a distance and relative speed to an object and a current state of movement of the vehicle;
    classifying objects as relevant only when despite an average driver response a collision occurs with greater probability, wherein
    at least two collision-relevant values are calculated using at least one of a vehicle sensor data value and an environmental sensor data value;
    the at least two collision-relevant values include a first collision-relevant value that describes possible future evasive action or evasive action that has already been initiated and a second collision-relevant value that describes a deceleration operation for preventing a collision;
    each of the collision-relevant values is limited by a threshold value, which indicates the beginning of a critical range;
    the related threshold values are only determined from vehicle sensor data;
    the first collision-relevant value indicates a distance (x) between vehicle and object and the related threshold value indicates a relevant distance (x_rel), at which it is possible to drive around an object with an average evasive action, and in case of driving straightforward the relevant distance (x_rel) is determined from the intersection of an external detection range of the environmental detection sensor and a projected vehicle trajectory with minimum radius and a deceleration size, the minimum radius being determined subject to the vehicle speed (v_car); and activating a braking device if at least one of the collision-relevant values lies in the associated critical range.

2. A method according to claim 1, wherein during a curve drive of the vehicle the relevant distance (x_rel) is defined as a function of the steering angle and starting from a current steering angle a certain future change is assumed in the steering direction in both directions within a certain time.

3. A method according to claim 1, including a multi-channel environmental detection sensor with a spatial resolution for determining the relevant distance (x_rel) for each channel.

4. A method according to claim 1, wherein an extension of an object is used for assessing the relevant distance.

5. A method according to claim 1, wherein the second collision-relevant value indicates a braking deceleration (a), which is necessary to not drive into a detected object, and the related threshold value is indicated by a relevant deceleration (a_rel), wherein the relevant deceleration (a_rel) depends on the relative speed ($\Delta v$) and on the distance (x) between the vehicle and the detected object and on additional safety parameters and the relevant deceleration (a_rel) indicates the maximum deceleration, which an average driver would initiate.

6. A method according to claim 5, wherein the relevant deceleration (a_rel) takes a value between 0.2 g and 0.4 g.

7. A method according to claim 5, wherein the strength of a braking intervention for prevention of a collision and the relevant deceleration (a_rel) are scaled with the vehicle speed.

8. A method for determining relevant objects in a vicinity of a motor vehicle by using an environmental detection sensor, the method comprising:
 calculating a distance and relative speed to an object and a current state of movement of the vehicle;
 classifying objects as relevant only when despite an average driver response a collision occurs with greater probability, wherein at least two collision-relevant values are calculated using at least one of a vehicle sensor data value and an environmental sensor data value;
 the at least two collision relevant values include a first collision-relevant value that describes possible future evasive action or evasive action that has already been initiated and a second collision-relevant value that describes a deceleration operation for preventing a collision;
 each of the collision-relevant values is limited by a threshold value, which indicates the beginning of a critical range; the related threshold values are only determined from vehicle sensor data;
 the first collision-relevant value indicates a distance (x) between vehicle and object and the related threshold value indicates a relevant distance (x_rel), at which it is possible to drive around an object with an average evasive action, and in case of driving straightforward the relevant distance (x_rel) is determined from the intersection of an external detection range of the environmental detection sensor and the projected vehicle trajectory with minimum radius and a deceleration size, the minimum radius being determined subject to the vehicle speed (v_car); and
 activating a braking device if at least one of the collision-relevant values lies in the associated critical range, wherein the method is carried out only in a predefined range of the vehicle speed, which is correlated with the detection range of the sensor.

9. A method according to claim 8, wherein the method is not carried out during a reverse drive.

10. A method according to claim 8, wherein the detection range of the environmental detection sensor is substantially smaller than 15 m.

11. A device comprising:
 an environmental detection sensor; and
 a control device with a stored programming for carrying out a method for determining relevant objects in a vicinity of a motor vehicle by using an environmental detection sensor, the method comprising:
 calculating a distance and relative speed to an object and a current state of movement of the vehicle;
 classifying objects as relevant only when despite an average driver response a collision occurs with greater probability, wherein
 at least two collision-relevant values are calculated using at least one of a vehicle sensor data value and an environmental sensor data value;
 the at least two collision-relevant values including a first collision-relevant value that describes possible future evasive action or evasive action that has already been initiated and a second collision-relevant value that describes a deceleration operation for preventing a collision;
 each of the collision-relevant values is limited by a threshold value, which indicates the beginning of a critical range;
 the related threshold values are only determined from vehicle sensor data;
 the first collision-relevant value indicates a distance (x) between vehicle and object and the related threshold value indicates a relevant distance (x_rel), at which it is possible to drive around an object with an average evasive action, and in case of driving straightforward a relevant distance (x_rel) is determined from the intersection an external detection range of the environmental detection sensor and a projected vehicle trajectory with minimum radius and a deceleration size, the minimum radius being determined subject to the vehicle speed (v_car); and
 activating a braking device if at least one of the collision-relevant values lies in associated the critical range.

12. A device according to claim 11, wherein the device is provided for a motor vehicle.

* * * * *